(12) United States Patent
Kinnunen

(10) Patent No.: US 6,855,181 B2
(45) Date of Patent: Feb. 15, 2005

(54) HEATING MEANS

(76) Inventor: Pasi Kinnunen, Makumäentie 27, FIN-83500 Outokumpu (FI)

(*) Notice: Subject to any disclaimer, the term of this patent is extended or adjusted under 35 U.S.C. 154(b) by 515 days.

(21) Appl. No.: 09/932,972

(22) Filed: Aug. 21, 2001

(65) Prior Publication Data

US 2001/0054250 A1 Dec. 27, 2001

Related U.S. Application Data

(63) Continuation of application No. PCT/FI00/00100, filed on Feb. 11, 2000.

(30) Foreign Application Priority Data

Feb. 22, 1999 (FI) .................................................. 990367

(51) Int. Cl.[7] .............................. C10L 5/44; C10I 11/06
(52) U.S. Cl. ............................ 44/520; 44/530; 44/531; 44/532
(58) Field of Search .......................... 44/520, 530, 531, 44/532

(56) References Cited

U.S. PATENT DOCUMENTS

| 143,277 | A | * | 9/1873 | Crumpton | 44/502 |
|---|---|---|---|---|---|
| 200,972 | A | * | 3/1878 | Boote | 44/520 |
| 229,596 | A | * | 7/1880 | Finck | 44/520 |
| 696,267 | A | | 3/1902 | Polland | |
| 739,131 | A | * | 9/1903 | Alder | 44/520 |
| RE12,409 | E | * | 11/1905 | Polland | 44/520 |
| 908,615 | A | * | 1/1909 | Sendlein | 44/520 |
| 3,877,886 | A | * | 4/1975 | Dalzell | 44/519 |
| 3,883,317 | A | * | 5/1975 | Neme | 44/522 |
| 4,063,904 | A | * | 12/1977 | Beeson | 44/520 |
| 4,116,645 | A | | 9/1978 | Dalzell | |
| 4,243,394 | A | | 1/1981 | Kincaid | |
| 4,818,249 | A | * | 4/1989 | Barrett, Jr. | 44/530 |
| 5,743,248 | A | * | 4/1998 | Jansen, Jr. | 126/25 B |

FOREIGN PATENT DOCUMENTS

| WO | WO 96/39475 | 12/1996 |
|---|---|---|
| WO | WO 97/21791 | 6/1997 |

* cited by examiner

*Primary Examiner*—Margare B. Medley
(74) *Attorney, Agent, or Firm*—Pillsbury Winthrop LLP

(57) ABSTRACT

The invention relates to a heating implement which comprises at least two frame parts (1, 2) which have been made from wood and are placed one on top of the other, at least one of which has at least one groove (3), or corresponding formation, for leading the combustion air into the structure of the heating implement. A heating implement formed in accordance with the invention has one or more spacing pieces (4) located in the groove (3), which are placed between the frame parts to form an air gap between them.

6 Claims, 2 Drawing Sheets

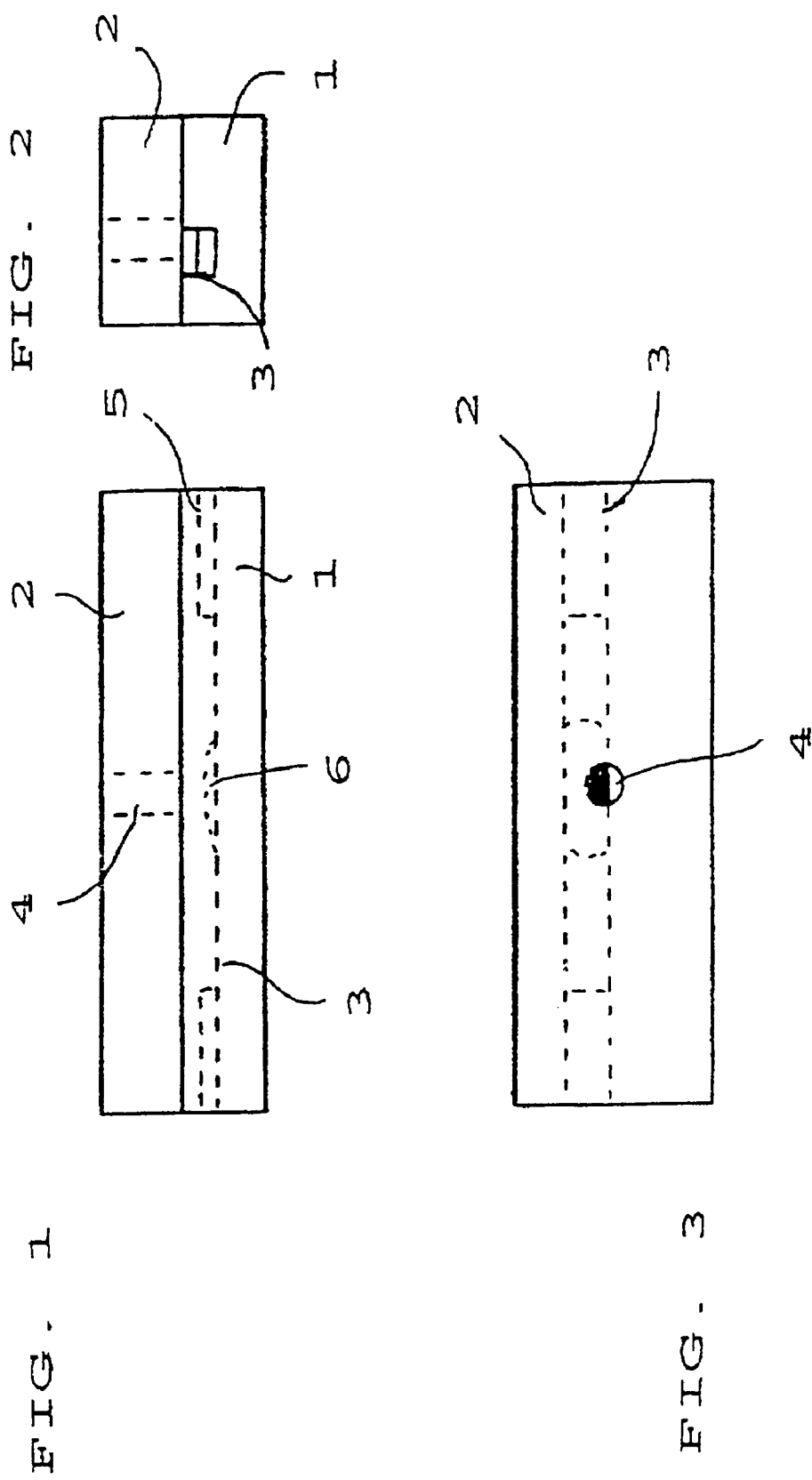

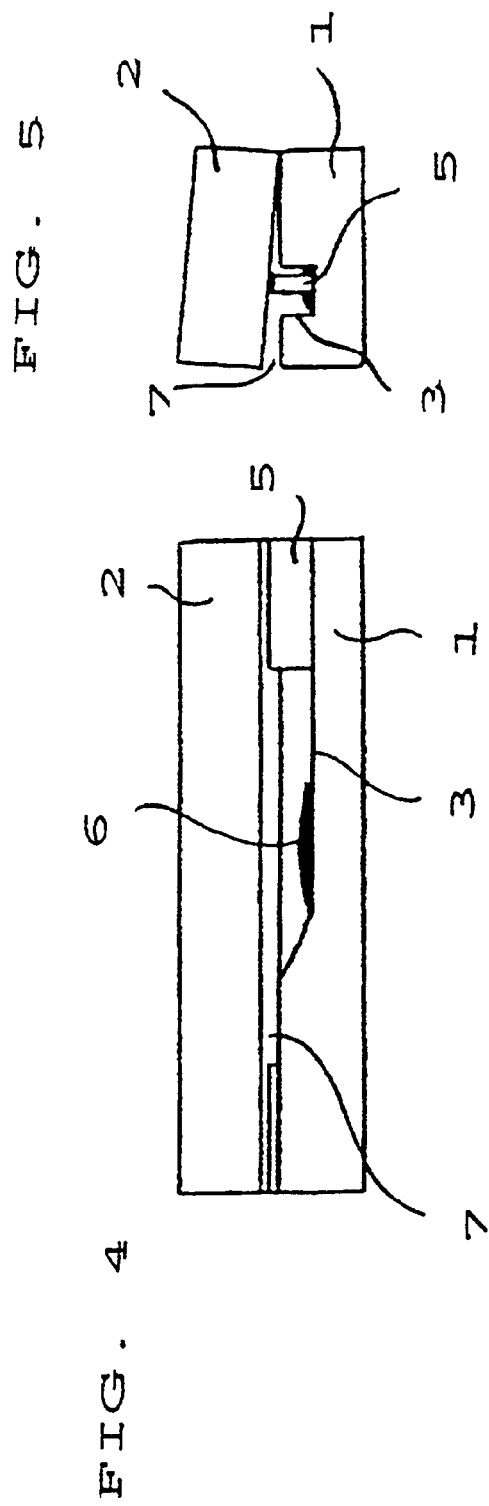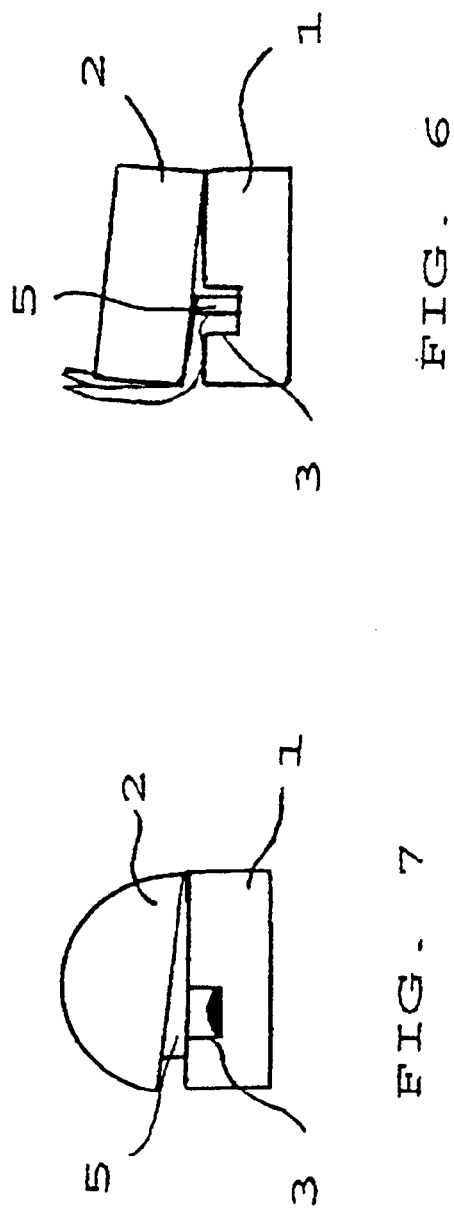

HEATING MEANS

This application is a continuation of PCT/FI00/00100, filed Feb. 11, 2000.

The invention relates to a heating implement which comprises at least two frame parts which have been made of wood and placed one on top of the other, at least one of which comprises at least one groove, or corresponding formation, for leading the combustion air into the structure of the heating implement.

Different heating implements, burning units or corresponding devices which have been made out of one or more species of wood are used on trips or corresponding occasions for preparing food and for creating an atmosphere. On trips, these are used as a substitute for a campfire, whereby fire, or a corresponding element, is quickly produced which can be used to prepare food, for warmth, for creating an atmosphere, or other such purpose. It is not necessary to gather wood for such campfires, rather it is immediately ready for burning. Additionally, such a heating implement can be used for disposing of trash. In places intended for fires, such as fireplaces or heaters, or corresponding places, these heating implements are used for atmosphere, to produce warmth and for food preparation, for example, for grilling sausage.

There are currently in existence and commonly known heating implements made from wood which are different in their structure. These known heating implements have several disadvantages associated with them. A makeshift campfire, a so-called "pocket campfire", is made by small strips of wood, or corresponding material, arranged in a cross-wise manner. This kind of makeshift campfire burns quickly. Furthermore, space is wasted in packaging for transport and it is complicated to produce.

In lumberjack candle-type burning products, the combustible matter is a big product made of wood, which comprises holes, notches, grooves or corresponding formations drilled into or otherwise formed in it, which ensure the burning of the fire. Such heating implements are big and awkward to transport. Furthermore, it is awkward to use them in small places intended to contain fires, and their flame is relatively small. A disadvantage is also that these generally leave burnt remains, because the burning cannot be controlled well.

Other packed burning products made and assembled from wood material are also known. These generally require complex machining and packing. An additional disadvantage is that they are generally not natural-looking. A further disadvantage is that separate combustible matter is necessary for lighting them and using them and in regards to their use on trips, some of them are too big.

The object of the invention is to provide a heating implement, by which the disadvantages associated with present day heating implements will be eliminated. In particular, the object of the invention is to provide a heating implement which is compactly packed, which burns reliably, safely and, relative to its size, for a long time, and which is easily portable, and which looks natural. Furthermore, the object of the invention is to provide a heating implement, the structure of which is simple and which can make use of scrap wood.

The object of the invention is accomplished with a heating implement, the characteristics of which are defined in the claims.

A heating implement formed in accordance with the invention has one or more spacing pieces located in a groove, which is/are put between the parts to form an air gap between them. The heating implement is a ready-made product made of two or more wooden pieces. It follows the traditional functioning principles of a slow-burning log fire, i.e. the combustion air and suction needed for burning comes about from the effect of the air gap between the burning pieces. In accordance with the invention, this air gap is produced by the spacing pieces, which are smaller than the actual burning piece, and which are placed between the frame parts said spacing pieces comprising an essential part of the heating implement.

A product formed in accordance with the invention is a natural product made from wood which replaces fossil fuels. It can be packed tightly because the solid wooden frame parts are advantageously produced from sawed timber so that the pieces can be rectangular in shape, nor is there a great amount of empty space inside the heating implement which gets wasted in transport. Its energy content is great in proportion to its weight and volume, because it is made of dried wood. The structure is simple and the product is easy to produce. An advantage is also that it is easy to transport for trips and home from the store, or elsewhere.

In an advantageous application of the invention, the igniting and supply of air for the combustion unit is improved by one or more grooves or holes machined in at least one of the frame parts, an appropriate burning speed is attained for every occasion of use, and the size and appearance of the flame is modified. Using different measurements and different kinds of wood for the frame parts in combination with the aforementioned grooves and holes, the burning duration of the burning product can also be regulated effectively in the desired way.

The burning duration cats be regulated in different ways, such as, by adjusting the air gap, and the heating implement burns long relative to its size. The burning and afterglow time is long enough to fry, grill and boil. An element formed in accordance with the invention also burns well under difficult weather conditions, for example, in wind, rain or corresponding weather. It burns safely because the air flow can be adjusted so that it is not too great. An additional advantage is that the product can be produced from scraps of lumber lots left over from the mechanized woodprocessing industry, whereby short pieces and trunks and log pieces which are unfit for sawmill use can be used.

The heating implement also advantageously comprises an igniting element, which ensures the easy and effective igniting of the combustion unit.

The invention shall now be described in more detail with reference to the accompanying drawing, in which FIG. 1 illustrates a certain heating implement formed in accordance with the invention, packed, as viewed from the side, FIG. 2 illustrates a heating implement formed in accordance with FIG. 1, as viewed from the end.

FIG. 3 illustrates a heating implement formed in accordance with FIG. 1, as viewed from above, FIG. 4 illustrates a heating implement formed in accordance with FIG. 1, in its position of use, as viewed from the side, FIG. 5 illustrates a heating implement formed in accordance with FIG. 1, in its position of use, as viewed from the end, FIG. 6 illustrates a heating implement formed in accordance with FIG. 5, in use, and FIG. 7 illustrates another application of a heating implement formed in accordance with the invention, in its position of use, as viewed from the end.

In an application formed according to FIGS. 1–6, the heating implement comprises two frame parts 1, 2 made of wood. The wooden pieces in question are solid wood and they are produced from pieces of sawn timber and advantageously from surplus material. The frame parts are mainly rectangular in shape and they are set one on top of the other on the broad side, mainly with the straight sides face to face.

In this application, a groove 3 is formed in the lower frame part 1 so that the groove extends lengthwise from end to end, and opens towards the upper frame part 2. The width, placing and form of the groove can vary in different applications. A hole 4 is made through the upper frame part 2, said hole extending to the groove 3 in the lower frame part 1. The hole is intended for the flame. The number location and form of the hole(s) can be different in other applications.

The heating implement additionally comprises two spacing pieces 5 which are detachable and have been positioned in the groove 3. The number of spacing pieces can vary in different cases, as can their form, which can be for example, rectangular, wedge-shaped, or otherwise shaped.

Additionally, an igniting element 6, which is a known and easily ignitable substance, or mixture of substances, suitable for the purpose, is located in the middle of the groove. In this application, a mixture of tar/sawdust is used, but in other applications, other substances can be used.

In the application illustrated in FIG. 7, the upper surface of the upper frame part 2 is curved and the spacing piece 5 is wedge-shaped. Otherwise, the structure on the whole corresponds to what has previously been presented.

A heating implement formed in accordance with the invention is one unit when it is packed according to FIGS. 1–3, which is easy to transport. When the heating implement is used, the pack is opened and the spacing pieces 5 are turned in the groove to one side, whereby they support the upper frame part 2 in an angular position in relation to the lower frame part 1, in the way illustrated in FIGS. 4–6. One edge of the upper frame part 2 is still on the edge of the lower frame part 1. Thus, an air gap 7 remains at one edge and at the ends. In FIG. 4, the right-sided part is cut away from the lower frame part to enable a view of the positioning of the spacing piece 5 and the position of the igniting element 6.

In an application in accordance with FIG. 7, the spacing pieces 5 are wedge-like and they are placed between the upper frame part 1 and the lower frame part 2, so that also in this application, the upper frame part is placed in an angular position relative to and on the lower frame part. Also in an application in accordance with FIGS. 1–6, wedge-like spacing pieces, or pieces of other shapes, can be used as spacing pieces, which are placed between the frame parts or between the vessel used for food preparation and the heating implement.

When the igniting element 6 is lit, the heating implement begins to burn. The air necessary for the burning can be obtained through the groove 3, the hole 4 and through the air gap 7. By changing the form of the groove and hole, or holes, the time needed for burning can be adjusted. Likewise, by changing the size, form and positioning of the spacing pieces, the size of the air gap is changed and thus also the flow of the combustion air, and the speed and strength of the burning is adjusted.

A product formed in accordance with the invention varies and its burning duration and the strength of its flame can vary according to the need for its use, for example, in the following ways: A certain way is to change the number, size and/or form of the frame parts, in other words, their thickness, length and/or width. Another way is to change the number, position and dimensions of the machined grooves and holes. The burning duration can also be influenced by changing the way that the wedge pieces used in the implementation are set between the frame parts, by changing their form, size and/or dimensions.

The heating implement can be modified in the desired way. The size of the frame parts in relation to one another can be modified in the desired way. It is also possible to make the upper frame part from two or more parts, whereby a gap is formed between them when they are burning. Thus, the spacing pieces are located between the lower and the upper frame parts. Also, a hole/holes can be made in the lower frame part, which can produce a bigger draft when the heating implement is located in such a place, that air can enter from beneath. Also their appearance can vary in the desired way, for example, by finishing them by machining or by leaving the outer surface as a birch or coated surface.

The invention is not limited to the advantageous applications presented herein. Its form may vary within the scope of the idea of the invention put forth in the claims.

What is claimed is:

1. Heating implement, which comprises
   at least two frame parts which are made out of wood and placed one on top of the other,
   at least one of frame part has at least one groove for leading the combustion air into the structure of the heating implement,
   inside the heating implement one or more spacing pieces have been placed in the groove,
   said spacing pieces can be placed between the frame parts to form an air gap between them, and
   there are one or more holes for the flame, which extend to the groove in at least one of the frame parts.

2. Heating implement in accordance with claim 1, in which
   the spacing piece is rectangular in shape.

3. Heating implement in accordance with claim 1, in which
   the spacing piece is wedge-shaped.

4. Heating implement in accordance with claim 1, in which
   the heating implement comprises an igniting element located in the groove.

5. Heating implement in accordance with claim 1, in which
   the opposing surfaces of the frame parts are nearly straight.

6. Heating implement in accordance with claim 1, in which
   the frame parts are made from solid wood.

* * * * *